F. E. RICKETTS.
ELECTRIC REGULATOR.
APPLICATION FILED JULY 1, 1911.
1,146,955.
Patented July 20, 1915.
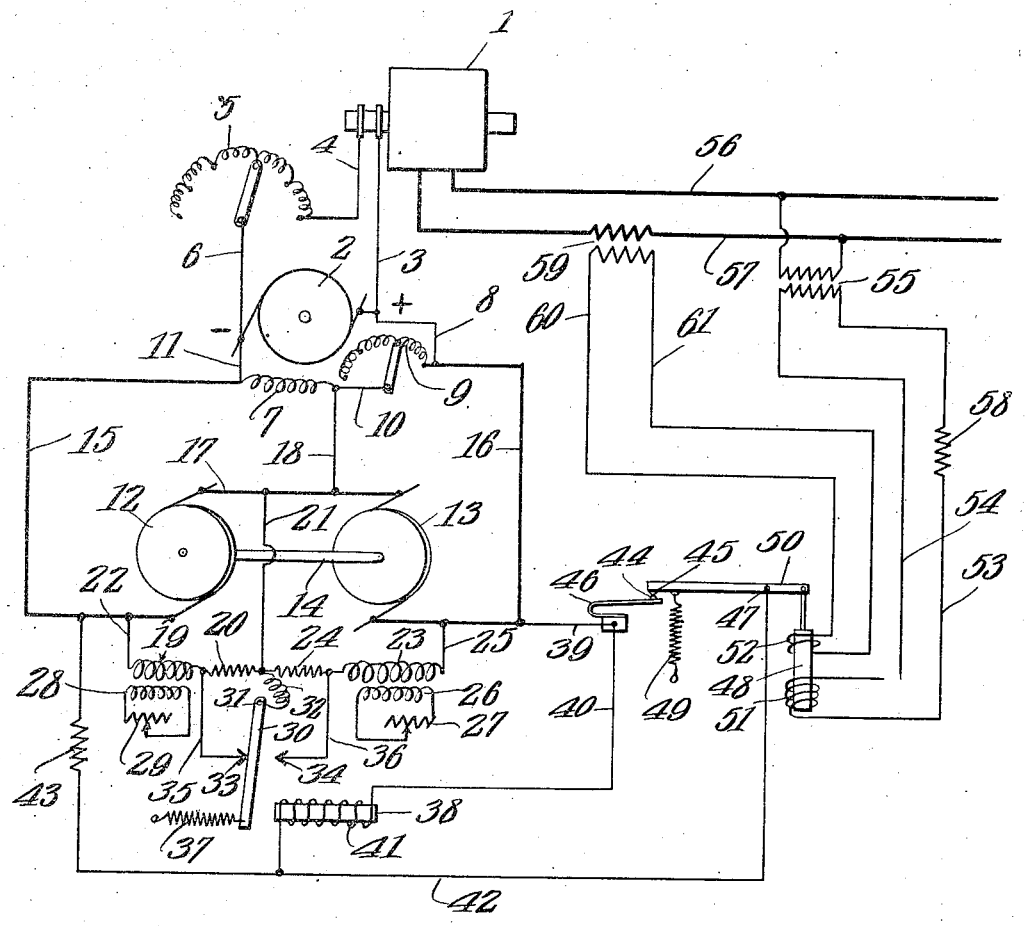
Witnesses
Frank B. Wooden.
Louis Mardaga.
Inventor
Forrest E. Ricketts.

UNITED STATES PATENT OFFICE.

FORREST E. RICKETTS, OF BALTIMORE, MARYLAND.

ELECTRIC REGULATOR.

1,146,955.

Specification of Letters Patent.

Patented July 20, 1915.

Application filed July 1, 1911. Serial No. 636,525.

*To all whom it may concern:*

Be it known that I, FORREST E. RICKETTS, a citizen of the United States, residing in the city of Baltimore and State of Maryland, have invented a new and useful Electric Regulator, of which the following is a specification.

My invention relates to regulators that are adapted to be employed in connection with electrical generators for causing the same to supply constant voltages to distributing circuits, and particularly to those the fields of which are separately excited.

In accordance with my invention regulation is accomplished by means of a source of electricity or regulating generator, so introduced into the circuit that its electromotive force may be used to control the field strength of the generator being regulated.

It is found when regulating separately excited generators by short-circuiting a portion of the field resistance of the exciter by the make and break of contacts solely under the control of the voltage of the armature circuit of the generator, that the exciter voltage will vary through wide ranges first being above and then below the value required to produce normal voltage at the armature terminals of the generator. This is caused by the inductance, principally in the field circuit of the generator, preventing the voltage of the generator from responding instantly to variations in the exciter voltage. Consequently when the contacts shortcircuit the field resistance of the exciter the exciter voltage will build up quite rapidly, and before the generator voltage is affected sufficiently to operate the contacts to check the exciter voltage, it will have increased beyond the desired limit. The exciter voltage will likewise over-run when the contacts are open, the result being that the exciter voltage will continue to swing first above and then below normal as long as the regulator is in operation. To prevent this over-running I have provided means for delaying the response of the exciter voltage to the operation of the short-circuiting contacts.

The invention will be best understood from a consideration of the following description taken in connection with the accompanying drawing forming a part of this specification, with the understanding, however, that the showing of the drawing being diagrammatic does not confine the invention to any special apparatus, nor is it necessary that the practical embodiment of the invention shall follow the exact arrangement shown in the drawing, the invention being susceptible of various modifications without departure from the spirit and scope of the invention.

In the drawing is shown a generator —1— which is assumed to be driven by power supplied from any convenient source and furthermore is assumed to have a rotating field and a stationary armature. The field current is furnished, in the system illustrated, by means of a current source shown as an exciter —2— similar in every respect to machines used in other systems for furnishing current for the field circuits of electric generators. One terminal of the exciter 2, say the positive, is connected through a conductor —3— to one terminal of the field circuit of the generator 1. The other terminal of the field circuit of the generator 1 is conected through a conductor —4—, an adjustable rheostat —5— and a conductor —6— to the negative terminal of the exciter. The exciter 2 has a field winding —7— connected in the usual way across its armature circuit through a conductor —8— an adjustable rheostat —9— and conductors 10 and 11. Conductors 8, 10 and 11 have very low resistances so that it may be said that the sum of the voltages of resistance 9 and field coil 7 will always equal the armature voltage of exciter 2. Furthermore, since the armature voltage of exciter 2 depends upon the voltage of its field winding, it can be controlled by varying the voltage of the field winding 7 and rheostat 9 inversely. To this end I have supplied a small motor generator set comprising two specially constructed direct current machines —12— and —13— mounted for synchronous rotation on a shaft —14. As will hereafter be described each of these machines will operate first as a motor and then as a generator depending upon the requirements of the regulator.

One armature terminal of the machine 12 is connected through conductor —15— to the terminal of field coil 7 connecting direct to the negative armature terminal of the exciter 2, and one terminal of machine 13 is connected through conductor —16— to the terminal of the rheostat 9 remote from the field coil 7, while the remaining terminals of machines 12 and 13 are electrically connected by a conductor 17. A conductor —18— leads from conductor 17 to conductor 10 thereby placing the armature of machine 12 in parallel with field coil 7 and the armature of machine 13 in parallel with rheostat 9.

Machine 12 has a field coil —19— which is connected through resistance —20— across its armature terminals by means of conductors —21 and —22. Machine 13 has a field coil —23— which is connected through a resistance —24— across its armature leads by means of conductors —25 and 21, the conductor 21 serving to connect both field circuits to the common connection of the armature circuits. Machine 13 has a second field winding —26— wound on the same pole pieces with winding 23 and so related thereto that it will retard by induction any variation in magnetism due to changes in the current strength in coil 23. Winding 26 is here illustrated as a series of coils on the pole pieces the free terminals of the series being short-circuited through a variable resistance —27— but good results have been obtained by placing one low resistance shortcircuit ring around each pole piece independent of the others. The object of the adjustment in resistance 27 is to vary the inductance of the circuit of the winding 26 so that the voltage of the armature circuit of the machine 13 will respond to changes of current in the field winding 23 as quickly as consistent with steady voltage in the armature circuit of the exciter 2. Machine 12 also has a second winding —28— shortcircuited through an adjustable resistance —29. The action of the coil 28 and the resistance 29 is similar with respect to machine 12 to that just described in reference to coil 26 and resistance 27 with respect to machine 13. The action of the windings 26 and 28 on machines 13 and 12 to prevent the voltage of exciter 2 from pumping is an important feature of my invention and will be referred to in detail later.

A movable lever —30—, pivoted at —31— and connected by a flexible conductor —32— to the common point of resistance 20 and 24 is adapted for alternately shortcircuiting the resistances 20 and 24 when the lever is brought into engagement first with contact —33— and then with contact —34—, the contact 33 being connected by a conductor —35— to the terminal of resistance 20 remote from conductor 32 and the contact 34 by a conductor —36— to the terminal of resistance 24 remote from conductor 32. The lever 30 is moved against contact 33 by a spring —37— and against contact 34 by a magnet —38—. The magnet 38 is energized by current flowing from conductor 16 through conductors —39 and —40 and coil —41 to conductor —42— which leads through a resistance —43— to conductor 15. Magnet coil 41 is adapted for being shortcircuited by a pair of contacts —44— and —45. Contact 44 is mounted on a spring —46— which is in electrical connection with conductors 39 and 40. Contact 45 is mounted on a lever —50— which is pivoted at a point —47— and moved in one direction by a magnet —48 and in the other direction by a spring —49. When the spring 49 overcomes the magnet 48 sufficiently to bring contacts 44 and 45 into engagement the magnet coil 41 will be shortcircuited, as the resistance of spring 46, contacts 44 and 45 and lever 50, is small compared with the resistance of the coil 41, and the spring 37 will pull lever 30 into engagement with contact 33.

Magnet 48 is influenced by two coils —51 and —52. Coil 51 is so related to core 48 that when current passes through the coil it will pull the core downward against the pull of the spring 49 tending to separate the contacts 44 and 45. Coil 51 is connected through conductors —53 and 54 to the secondaries of a potential transformer —55, the primaries of which are connected across conductors —56 and 57 forming the armature circuit of the generator 1. Intermediate the conductor 53 is a resistance —58— the function of which is to maintain the current in coil 51 substantially in phase with the secondary voltage of transformer 55.

A transformer —59— has its primary connected in series with the armature lead 57 and its secondary connected through conductors —60 and 61— to the coil 52. Coil 52 is so related to coil 51 that its magnetism will oppose that of coil 51 and as the current in coil 52 will vary with the current in armature lead 57, the effect will be to require a greater voltage in the armature circuit of the generator to separate the contacts when the current in the armature lead 57 increases. This feature is necessary when it is desirable to compensate for the voltage drop in conductors 56 and 57 to maintain a constant voltage at some point remote from the generator 1.

For the sake of illustrating the practical operation of the regulator, we will assume that the voltage of the armature circuit of the generator 1 is below normal and the contacts 44 and 45 are closed, short-circuiting magnet coil 41 when the spring 37 will pull lever 30 into engagement with contact 33. Then the full voltage of machine 12 will be applied to its field coil 19 while resistance 24 will be cut in series with field coil 23 across the armature of the machine 13, therefore the current in coil 19 will increase while that in coil 23 will decrease and the magnetism in the field of machine 12 will begin to increase while that in the field of machine 13 will begin to decrease, causing machine 13 to operate as a motor driving machine 12 as a generator to increase the voltage supplied to field coil 7. The voltage supplied to the field circuit of the generator 1 will be in proportion to the voltage applied to field coil 7, therefore the voltage of the armature circuit of generator 1 will increase until the magnet 48 responds to open contacts 44 and 45. But by the time the contacts open, the voltage of the machines 12 and 13 will have varied to a much greater extent than was necessary to restore the voltage of the armature circuit of generator 1 to normal but for the windings 26 and 28 which are inductively related to the coils 19 and 23, thereby delaying changes in the field magnetism in machines 12 and 13. Assuming now that the resistances 27 and 29 are properly adjusted by the time the machines 12 and 13 have varied an allowable degree beyond the necessary value to restore the condition of the armature circuit of generator 1, the magnet 48 will have had time to respond to open the contacts 44 and 45, thereby affecting the magnet 38 to pull the lever 30 against the tension of spring 37 to break contact 33 and establish contact at 34. Then the condition of machines 12 and 13 will be reversed; that is, field coil 23 will receive the full voltage of the armature circuit of machine 13 while the strength of coil 19 will be decreased by resistance 20. Therefore the machine 12 will operate as a motor to drive the machine 13 as a generator, thereby increasing the voltage supplied to rheostat 9 at the expense of the voltage of the field 7. Then the exciter 2 will operate to decrease the voltage of the generator 1, thereby allowing spring 49 to overcome the magnet 48 to close contacts 44 and 45. This change in voltage will, however, be delayed to the same extent by windings 26 and 28 as experienced on the increase in voltage. The regulator will continue through a series of cycles similar to the one just described as long as it is in operation, the voltage on conductors 56 and 57 being held noticeably constant, except, when the current in lead 57 changes sufficiently to require a change in voltage in order to maintain a uniform voltage at some distant point, the coil 52 will influence magnet 48 just enough to accomplish the desired result.

What is claimed is:—

1. The combination with a main dynamo-electric machine, an exciter therefor, a field magnet winding for the exciter, and a resistance in series therewith, of two auxiliary dynamo-electric machines having their armatures connected in series relation and respectively in parallel with the said field winding and the said resistance, a shunt field magnet winding for each of said auxiliary machines, resistances respectively in series therewith, means for alternately shunting the said resistances in response to variations in the voltage of the main dynamo-electric machine, and a short-circuited field winding for each of said auxiliary machines.

2. The combination with a main dynamo-electric machine, an exciter therefor having a shunt field magnet winding, and a resistance in series with the said winding, of two auxiliary dynamo-electric machines having their armatures connected in series relation, the terminals of the said series being connected to the terminals of the exciter, and the common terminal of the said armatures being connected between the exciter field magnet and the said resistance, a shunt field magnet winding for each of said auxiliary machines, resistances respectively in series therewith, means for alternately shunting the said resistances in response to variations in the electrical condition of the main dynamo-electric machine, and a short circuited field winding for each of said auxiliary machines.

3. The combination with a main dynamo-electric machine, an exciter therefor having a shunt field magnet winding, and a resistance in series with the said winding, of two auxiliary dynamo-electric machines having their armatures connected in series relation, the terminals of the said series being connected to the terminals of the exciter, and the common terminal of the said armatures being connected between the exciter field magnet and the said resistance, a shunt field magnet winding for each of said auxiliary machines, resistances respectively in series therewith, means for alternately shunting the said resistances in response to variations in the electrical condition of the main dynamo-electric machine, a short circuited field winding for each of said auxiliary machines, and a variable resistance included in each of said short circuits.

4. The combination with a main dynamo-electric machine having an armature circuit, and an exciter for said machine having a field circuit, of a regulating generator in parallel with a portion of the field circuit of the exciter, and means for controlling the voltage of the regulating generator, said means being controlled by the condition of the armature circuit of the main dynamo-electric machine.

In testimony that I claim the foregoing as my own, I have hereto affixed my signature in the presence of two witnesses.

FORREST E. RICKETTS.

Witnesses:
 JOHN T. FARDY,
 STEPHEN D. BROADBENT.